United States Patent [19]

Shin

[11] Patent Number: 4,784,778

[45] Date of Patent: Nov. 15, 1988

[54] CORROSION INHIBITING COMPOSITION FOR ZINC HALIDE-BASED CLEAR, HIGH DENSITY FLUIDS

[75] Inventor: Charles C. Shin, Lafayette, Ind.

[73] Assignee: Great Lakes Chemical Corp., West Lafayette, Ind.

[21] Appl. No.: 913,702

[22] Filed: Sep. 30, 1986

[51] Int. Cl.$^4$ ............... E21B 43/00; E21B 41/02
[52] U.S. Cl. ................... 252/8.551; 252/8.555; 252/389.61; 252/389.62; 252/395
[58] Field of Search ............. 252/8.51, 8.514, 8.551, 252/8.555, 389.62, 389.61

[56] References Cited

U.S. PATENT DOCUMENTS 4,536,302 8/1985 Augsburger et al. ............ 252/8.551
4,539,122 9/1985 Son et al. ..................... 252/8.551

FOREIGN PATENT DOCUMENTS 1197673 12/1985 Canada ........................ 252/8.551
2027686  2/1980 United Kingdom ............. 252/8.551

*Primary Examiner*—Herbert B. Guynn
*Attorney, Agent, or Firm*—Kirkland & Ellis

[57] ABSTRACT

Thio group corrosion inhibitors and aldose group antioxidants when combined provide a synergistic corrosion inhibition system for clear, high density oil and gas completion and workover fluids.

17 Claims, No Drawings

CORROSION INHIBITING COMPOSITION FOR ZINC HALIDE-BASED CLEAR, HIGH DENSITY FLUIDS

BACKGROUND OF THE INVENTION

1. Field of the Invention.

The present invention relates to corrosion inhibition of zinc bromide/calcium halide-based clear, high density fluids used in the completion and work over of oil and gas wells and more particularly to corrosion inhibitors incorporating a synergetic combination of thio group of corrosion inhibitors and an aldose group antioxidant.

2. Description of the Prior Art.

In oil and gas well drilling, a completion or workover fluid is any fluid that is placed across a production zone before or immediately after perforation, or a fluid placed across the formation during reworking operations such as underreaming, gravel packing, or any remedial work that must be accomplished in efforts to obtain increased production. Its primary functions are to provide pressure control, to prevent formation fluid from coming into the well bore, to maintain hole stability, to minimize formation of production damage, to minimize corrosion to downhole metals during the time of contact, and to provide carrying capacity for debris, cuttings, or loose sand that is encountered.

Because they are solids free and discourage the swelling of clays, brines of wide density range brines are utilized as completion or workover fluids. However, such brines are frequently more corrosive than other fluids. Substantial corrosion of metal drill pipe is often experienced when drilling into high temperature subterranean formations. The high temperature bottom hole condition combined with the corrosive brines and high dissolved oxygen levels, are conducive to excessive corrosion of drill pipe, casing, and other metal equipment. The life expectancy of drill pipe employed under these conditions is relatively short, requiring frequent inspection and replacement. Furthermore, an even more serious problem is the failure of drill pipe in service where it breaks leaving a lower section of the drill pipe in the well. This failure interrupts the drilling operation, often requiring expensive fishing operations. An unsuccessful fishing operation results in the pipe remaining in the well and the well being abandoned.

Deeper and higher temperature wells require higher density brines. Brines such as zinc halide can meet this requirement. However, corrosion problems are magnified with zinc halide completion or workover fluids. In sodium or calcium based fluids, corrosion can be controlled to an acceptable level by raising the pH, adding film forming amine, or admixing with oxygen scavengers. However, in the case of zinc based fluids, the pH cannot be raised without the undesirable side effect of precipitating the zinc ion out of solution. Film-forming amine based corrosion inhibitors are either not effective enough or not soluble enough, and conventional oxygen scavengers such as hydrazine and sulfites form precipitates or leave insoluble residues which will damage formation of production zones.

Although conventional corrosion inhibitors such as ammonium thioglycolate and ammonium thiocyanate reduce the corrosion of iron and steel casing, tubing and equipment exposed to the high temperature and concentrated aqueous solutions of zinc bromide, calcium bromide and calcium chloride, they have not solved the problem completely.

More particularly, Canadian Pat. No. 1,197,673 describes in detail a corrosion inhibiting system for zinc-based fluids. It describes several corrosion inhibitors which provide corrosion protection to iron and steel casing, tubing and equipment exposed to high temperatures, and highly concentrated aqueous solutions of zinc bromide, calcium bromide and calcium chloride used as completion, workover or packer fluids. The inhibitors are effective in aqueous zinc based fluids in the density range of 15.0 to 19.2 lb/gal at temperatures up to and including 400° F. (204° C.), and up to 90 days. Pitting corrosion is minimized when the inhibitors are added to 19.2 lb/gal zinc bromide/calcium bromide fluids. The preferred composition contains 1.0 weight percent ammonium thioglycolate (50–60% solution). Even though these inhibitors reduce corrosion, the problem has not been solved completely.

European Pat. No. 0,153,192 describes corrosion inhibitors for use in the protection of metals from the corrosive effect of heavy brines, particularly zinc halide brines, employed in the drilling, completion and workover of well bores penetrating subterranean formations. The monovalent and divalent salts of erythorbic acid, when admixed in a sufficient amount with a heavy brine solution, are disclosed to inhibit the corrosive effect of heavy brines on metals in contact with the solutions, and do not precipitate from the brines upon addition thereto, or upon a change in pH or temperature of a solution. The corrosion inhibiting effect is proposed by the inventors to take place through several mechanisms. Since erythorbic acid is used as an effective oxygen scavenger in boiler water systems, the inventors speculated that one of the inhibiting mechanisms is an oxygen scavenging process. None of the mechanisms described in the patent is related to the synergic scavenging effect of the erythorbic acid in the presence of thio containing inhibitors.

U.S. Pat. No. 3,634,270 describes a mixture of organic nitrogen and sulfur compounds which prevents the corrosive ingredient of the solution from attacking metal. Application to industrial boiler and heat exchanger cleaning is suggested. Sulfur compounds such as thiourea, allylthiourea, sodium mercaptobenzothiazol, mercaptothiazolene, sodium thiocyanate, and mixtures thereof are suggested to be particularly effective. Some of the nitrogen compounds which are to be particularly effective are normal alkylamine, having 1 to 20 or more carbon atoms in the alkyl substituent, iso-alkyl and ter-alkylamines having up to 20 carbon atoms in the alkyl substituent, di-alkylamines having 1 to 20 alkyl groups in the alkylsubstituents, diamines, ammonias, ureas, thioureas, amides, ammonium salts, and alicyclic, hetrocyclic, and aromatic amines. The inhibitor systems were tested at temperatures no greater than 300° F. and for periods no longer than 16 hours. Such short term protection is of little use in oil well completion or workover fluids. In addition, most of the amines claimed to be effective are not sufficiently soluble in the highly concentrated zinc bromide and calcium bromide brines.

In addition, bisulfites, sulfites, and hydrazines are oxygen scavengers commonly used in the oil fields. While sodium and ammonium salts of sulfites and bisulfites show some scavenging effects and reduced corrosion rates somewhat, they also form insoluble residues in the fluids. Hydrazine is not effective in reducing oxygen concentration and also forms a white precipitation. Other scavengers such as methyl-ethyl ketoxime, cyclohexylamine, N-N-diethylhydroxylamine, carbohydrazide and morpholine, etc., are not soluble enough to be effective for oil field use.

Thus, a primary object of the present invention is to develop an effective corrosion inhibitor composition for use in zinc halide-based clear fluids.

A further object is to provide a composition of the character described, incorporating a synergistic thio group-corrosion inhibitor aldose group antioxidant system which will effectively control corrosion in zinc bromide/calcium halide fluids.

SUMMARY OF THE INVENTION

The foregoing and other objects, advantages, and features of the subject invention may be achieved with a corrosion inhibiting composition adapted for use with clear, high density fluids having application as well completion and workover media. Such compositions comprise a corrosion inhibiting amount of a thio group corrosion inhibitor in combination with an effective amount of an aldose group antioxidant.

More particularly, the thio group corrosion inhibitor may be selected from the group consisting of alkali metal and ammonium thioglycolates and thiocyanates, thiourea, mercaptoacedic acid and salts thereof, dithiodiglycolic acid, and mixtures thereof. The aldose group antioxidant may be selected from the group consisting of arabinose, ascorbic acid and salts thereof, isoascorbic acid and salts thereof, gluconic acid and salts thereof, and mixtures thereof. The corrosion inhibiting compositions desirably are formulated with about 5-95 parts by weight of the thio group corrosion inhibitor and about 95-5 parts by weight of the aldose group antioxidant.

The foregoing corrosion inhibiting compositions may be utilized in clear aqueous solutions of zinc bromide and calcium halide and, optionally, one or more alkali metal halides. Such fluids have a density of about 10-20 pounds per gallon. Desirably, the corrosion inhibiting composition is supplied in the clear fluid at a level of about 0.05-5.00 parts per hundred parts of the clear solution. Such fluids normally exhibit pH's within the range of up to about 7.0, preferably, about 1.0-6.0.

In its method aspect, the present invention embodies the injection into oil and gas wells of the foregoing corrosion inhibited high density fluids during completion and workover of such wells.

DETAILED DESCRIPTION OF THE PREFERRED EMBODIMENTS

The primary causes of corrosion in zinc and calcium based fluids are dissolved oxygen and the zinc ion. Even traces of oxygen in such fluids are known to cause corrosion problems when then are utilized in well completion or workover.

In order for a compound or a chemical system to be used as an inhibitor or an inhibiting system in the well drilling industries, its desirable properties are to (1) dissolve in the fluid completely without leaving any residue, (2) control corrosion at temperatures up to 400° F. or higher, (3) control corrosion for an extended period of at least 30 days, and (4) not interfere with other period of at least 30 days, and (4) not interfere with other chemical additives commonly used in the drilling industries.

It has been discovered that aldose group organic antioxidants reduce the concentration of oxygen in the zinc ion containing brines when those brines are inhibited with thio group inhibitors. Accordingly, in its broadest aspect, the present invention involves a corrosion inhibitor composition adapted for use with clear high density fluids having application as well completion and workover media comprising a corrosion inhibiting amount of a thio group corrosion inhibitor and an effective amount of an aldose group antioxidant.

Thio group corrosion inhibitors which may be employed in accordance with the present invention include ammonium thioglycolate and thiocyanate, sodium thioglycolate and thiocyanate, thiourea, mercapto acetic acid, sodium mercaptoacetate, dithiodiglycolic acid and other thio mixtures thereof. Preferred thio group corrosion inhibitors include sodium thiocyanate and mixtures of sodium thiocyanate and ammonium thioglycolate.

Aldose group anitoxidants which may be used in accordance with the invention include arabinose, ascorbic acid, isoascorbic acid, gluconic acid, alkali metal, alkaline earth, or other metal salts of ascorbate, isoascorbate, and gluconate. Preferred aldose group corrosion inhibitors include ascorbic acid and mixtures of ascorbic acid and gluconic acid.

The zinc and calcium halide brines which may be successfully corrosion inhibited in accordance with this invention are described in U.S. Pat. Nos. 4,292,183, 4,304,677, and 4,278,850. These brines are aqueous solutions containing zinc and calcium ions supplied by zinc bromide and one or more of calcium bromide and calcium chloride, and may additionally contain other alkali metal halides such as sodium bromide, sodium chloride, potassium bromide, and lithium bromide. Such fluids desirably have densities lying in general in the range 14.2-19.2 pounds per gallon ("ppg"). Fluids of a desired density may be obtained by blending lighter density fluids with a base fluid such as 19.2 ppg zinc bromide/calcium bromide fluid.

Clear fluids in accordance with this invention are generally useful at pH's lying in the range of up to about 7.0, preferably, about 1.0-6.0 and may be adjusted as is well known to those skilled in the art.

The corrosion inhibiting agents may be added to the clear fluids in substantially any convenient manner. Thus, a mixture of thio group corrosion inhibitor and aldose group antioxidant may be added directly to the zinc and calcium halide clear fluid either in solid form or in the form of an aqueous corrosion inhibitor composition. Alternatively, the thio group corrosion inhibitor may be separately added into the zinc bromide/calcium bromide base solution to provide an inhibited base solution, and the aldose group antioxidant thereafter may be added to the inhibited base solution, or a solution of modified density prepared therefrom, in either solid or aqueous solution form immediately prior to use. The preparation of a corrosion inhibited zinc bromide/calcium bromide base fluid using a thio group corrosion inhibitor is disclosed in Canadian Pat. No. 1,197,673. Other methods of addition may be employed so long as the corrosion inhibiting amount of thio group corrosion inhibitor and the effective amount of aldose group antioxidant are provided in the zinc bromide/calcium bromide fluid at the time of injection into the oil or gas well.

Where the thio group corrosion inhibitor and aldose group antioxidant are supplied together as a corrosion inhibitor composition, they desirably contain about 5-95 parts by weight thio group corrosion inhibitor and about 95-5 parts by weight aldose group antioxidant. Preferably, such a composition is formulated with about one parts by weight thio group corrosion inhibitor and about two parts by weight aldose group antioxidant.

When such a corrosion inhibiting composition is employed to inhibit zinc bromide/calcium bromide clear fluids, such a corrosion inhibitor composition is supplied to the clear fluid at a level at about 0.05-5.00, preferably 01-1.0, parts per hundred parts of clear high density fluid.

Where the thio group corrosion inhibitor and aldose group antioxidant are separately added to the clear high density zinc bromide calcium bromide fluid, it is desirable that the thio group corrosion inhibitor be present in the clear fluid at a level of about 0.1-0.5 parts per hundred parts clear fluid, and that the aldose group antioxidant be supplied at a level of about 0.1-1.0 parts per hundred parts by weight of the clear high density fluid.

Exemplary corrosion inhibitor compositions in accordance with the present invention are given in the following examples:

EXAMPLE I

| Constituent | Parts by Weight |
| --- | --- |
| Sodium thiocyanate | 2 |
| Ascorbic acid | 3 |

EXAMPLE II

| Constituent | Parts by Weight |
| --- | --- |
| Sodium thiocyanate | 4 |
| Ammonium thioglycolate | 5 |
| Ascorbic acid | 2 |
| Gluconic acid | 6 |

EXAMPLE III

| Constituent | Parts by Weight |
| --- | --- |
| Sodium thiocyanate | 2 |
| Gluconic acid | 3 |

EXAMPLE IV

| Constituent | Parts by Weight |
| --- | --- |
| Ammonium thioglycolate | 5 |
| Ascorbic acid | 4 |

Oxygen concentrations in corrosion inhibited zinc bromide/calcium bromide brines in accordance with this invention may be reduced to 40 to 200 ppb depending on the initial concentration, representing a reduction of more than 70% of the dissolved oxygen within one hour. While the the present invention is not limited to any particular mechanism, it is believed that the thio group plays a role in the process of oxidizing aldose to either aldonic acid, aldaric acid, or osones, thereby depleting the free oxygen content of the clear fluids.

EXPERIMENTAL EVALUATIONS

The corrosion inhibiting abilities of the fluids of this invention have been evaluated through extensive corrosion tests at temperatures ranging from 300° to 450° F. Coupons of mild steel (AISI 1010), with dimensions 1"×2"×⅛" (0.25" diameter hole for mounting) were obtained from Jack Orr Metal Works in Houston and used without further cleaning. All the corrosions tests for the work of the invention were done in Parr's high pressure cells with about 200 ml of fluids contained in a glass liner to prevent electrical conducting between coupon and the bomb.

Extra care was taken to prevent bubbles forming on the surface of the coupons when being immersed in the fluids. The cells are pressurized with nitrogen or oxygen gas to keep the fluid in a liquid state at the test temperature.

The procedure for the tests is summarized as follows: The oven was set at the appropriate temperature level. (e.g., 200°, 250°, 300°, 350°, 400° or 450° F.). The coupons were washed in acetone and toweled dry. The coupons were weighed to the nearest 0.01 milligram using an analytical balance and suspended from a glass hook supporting post without touching the sides or bottom of the glass liner.

After blending the fluid with inhibitor and/or antioxidant, it was filtered and the density and pH were checked. The fluid was then added to the glass liner. The bomb was pressurized to the appropriate pressure with nitrogen gas by using high pressure regulator. After test period is over, the bomb was allowed to cool for at least an hour to allow the internal pressure to drop.

The coupons were then examined. If necessary, qualitative analysis of adherent scale or foreign material was performed. A few new coupons were weighed and immersed along with the test coupons in a suitable hydrocarbon solvent, such as clean xylene or toluene, long enough to remove the oil, oil wet materials, and paraffins. The coupons were dried in a gentle dry air stream. The coupons were then immersed in an inhibited hydrochloric acid just long enough (usually less than 5 minutes) to remove mineral scale and corrosion product. After cleaning, the coupons were immediately immersed in a saturated solution of sodium bicarbonate for one minute to neutralize the acid. The coupons were rinsed with water, rinsed in isopropyl alcohol or acetone, and dried in a stream of air.

The coupons were then weighed, making sure that weight loss from cleaning is not significant. If the weight loss of the preweighed blank was significant, a correction was made to compensate for the weight loss from cleaning. Any abnormal conditions of the coupons (such as color, pitting, streaking, film coating, or crystal formation) were noted.

Corrosion in mils per year (mpy) was then calculated using the following formula:

$$mpy = \frac{(534)(\text{weight loss})}{(\text{coupon density})(\text{coupon area})(\text{time})}$$

where
weight loss is in milligrams
coupon density is in gram/cm$^3$
coupon area is in inch$^2$
time is in hours The concentration of dissolved oxygen in the fluid was determined using a YSI digital dissolved oxygen meter, model #58, at room temperature and pressure. The measured oxygen concentration in zinc based fluids tested ranged from 200 to 500 ppb (parts per billion). Even though the solubility of oxygen in the fluids is low, extra oxygen can enter the system through surface operation or in rare cases it can be produced from oil bearing zones.

EXAMPLE VI

One day corrosion rates were determined in the 17.5 ppg zinc bromide/calcium bromide fluid at 300° F. and the results are listed in Table I. The 17.5 ppg fluid was blended from 19.2 ppg zinc bromide/calcium bromide and 14.2 ppg calcium bromide fluid and contained approximately 40 weight percent zinc bromide and 30 weight percent calcium bromide. The inhibited fluids were prepared in the same manner as the uninhibited fluids except that the base 19.2 ppg fluid was inhibited with thio group corrosion inhibits as Canadian Pat. No. 1,197,673. The 19.2 ppg fluid contained 1.0 weight percent aqueous ammonium thioglycolate solution (55–60%). The corrosion rates in Table I show that the addition of 0.5% sodium ascorbate or sodium ascorbate plus isoascorbic acid effectively reduced corrosion rates by approximately 50% over the rates achieved by this group inhibitor only. Introduction of ammonium thiocyanate further reduced the rate, indicating ammonium thiocyanate may be a better inhibitor.

TABLE I

One Day Corrosion Tests in 17.5 ppg $ZnBr_2/CaBr_2$ at 300° F.

| Inhibitor | Scavenger | Corrosion Rate (mpy) | % Protection |
|---|---|---|---|
| $HSCH_2COONH_4$ | Blank | 82.3 | |
| $HSCH_2COONH_4$ | Na—ascorbate | 47.3 | 42.5 |
| $HSCH_2COONH_4$ | Na—ascorbate plus Isoascorbic acid | 49.0 | 40.5 |
| $HSCH_2COONH_4$ plus $NH_4SCN$ | Na—ascorbate | 37.1 | 54.9 |

EXAMPLE VII

The effectiveness of corrosion inhibiting of an alkaline earth salt of ascorbic acid, calcium ascorbate, as an antiooxidant was compared with sodium ascorbate and isoascorbic acid. The results of one day corrosion tests in 17.5 ppg zinc bromide/calcium bromide at 350° F. are listed in Table II and show that calcium ascorbate is as effective an antioxidant as sodium ascorbate or isoascorbic acid.

TABLE II

One Day Corrosion Tests in 17.5 ppg $ZnBr_2/CaBr_2$ at 350° F.

| Inhibitor | Scavenger | Corrosion Rate (mpy) |
|---|---|---|
| $NH_4SCN$ | Isoascorbic acid | 53.6 |
| $NH_4SCN$ | Sodium ascorbate | 54.3 |
| $NH_4SCN$ | Calcium ascorbate | 51.5 |

EXAMPLE VIII

The corrosion rate obtained with the combination of sodium thiocyanate and isoascorbic acid was compared with the rates exhibited by the combination of sodium thiocyanate and other aldose group antioxidants such as sodium gluconate and arabinose. The seven-day corrosion rates in 18.5 ppg zinc bromide/calcium bromide fluids at 350° and 450° F. were determined and the results are listed in Table III. The results show that the systems of sodium thiocyanate and other aldose group antioxidants are comparable to the systems of sodium thiocyanate and isoascorbic acids as corrosion reducing systems. This indicates that sodium gluconate, arabinose or mixtures of two or three aldoses are just as effective as as isoascorbic acid and sodium ascorbate.

TABLE III

Seven Day Corrosion Tests in 18.5 ppg $ZnBr_2/CaBr_2$

| Temp (°F.) | Inhibitor | Scavenger | Corrosion Rate (mpy) |
|---|---|---|---|
| 350 | NaSCN | Na—gluconate | 10.7 |
| 350 | NaSCN | Isoascorbic acid | 10.2 |
| 350 | NaSCN | Na—gluconate + Isoascorbic acid | 11.1 |
| 350 | NaSCN | Na—gluconate + Na—ascorbate | 11.4 |
| 400 | NaSCN | Arabinose | 10.8 |
| 400 | NaSCN | Isoascorbic acid | 11.1 |

EXAMPLE IX

Even though ammonium thiocyanate/sodium ascorbate appear be a better corrosion inhibiting system than ammonium thioglycolate/sodium ascorbate, slight pitting was observed after a period of thirty days. In order to eliminate this pitting, ammonium thiocyanate was replaced with sodium thiocyanate and no pitting was observed after 25 days. Fourteen and 25 day corrosion rates of sodium thiocyanate/isoascorbic acid system along with sodium thiocyanate alone, ammonium thioglycolate alone, and ammonium thioglycolate/Na-ascorbate system are listed in Table IV. The corrosion rates show that addition of an antioxidant reduces corrosion up to 33.3%, and the sodium thiocyanate plus antioxidant system is more effective than the ammonium thioglycolate plus antioxidant system.

TABLE IV

Fourteen and Twenty-Five Day Corrosion Tests in 18.5 ppg $ZnBr_2/CaBr_2$ at 350° F.

| Time (day) | Inhibitor | Scavenger | Corrosion Rate (mpy) | % Protect* |
|---|---|---|---|---|
| 14 | NaSCN | Blank | 10.8 | |
| 14 | NaSCN | Isoascorbic acid | 7.2 | 33.3 |
| 25 | $HSCH_2COONH_4$ | Blank | 10.6 | |
| 25 | $HSCH_2COONH_4$ | Na—ascorbate | 7.7 | 27.4 |

*% protection over the corrosion rate by inhibitor only

EXAMPLE X

In order to find an effective dose of antioxidant and corrosion inhibitor, 7 and 13 day corrosion rates were determined as listed in Table V. The results indicate that isoascorbic acid alone is not effective as a corrosion inhibitor, that changes in sodium thiocyanate concentration 2.0 to 0.6 weight percent do not change the corrosion rates, and that increased amounts of isoascorbic acid reduce corrosion further. These findings clearly illustrate the synergic effect of isoascorbic acid with thiocyanate inhibitors. In the presence of aldose grup antioxidants in the zinc bromide/calcium bromide fluid, the thio group compound may act as a catalyst to promote the oxidizing process of the aldose group without consuming itself.

TABLE V

Seven and Thirteen Day Corrosion Tests in
18.5 ppg ZnBr$_2$/CaBr$_2$ at 350° F.

| Time (day) | Inhibitor | Scavenger | Corrosion Rate (mpy) | % Protection (I) | (II) |
|---|---|---|---|---|---|
| 7 | Blank | Blank | 94.7 | 0 | |
| 7 | NaSCN | Blank | 13.3 | 86.0 | 0 |
| 7 | Blank | Isoascorbic acid | 41.2 | 56.5 | |
| 7 | .2% NaSCN | Isoascorbic acid | 10.2 | 89.2 | 23.3 |
| 7 | .4% NaSCN | Isoascorbic acid | 10.8 | 88.6 | 18.8 |
| 7 | .6% NaSCN | Isoascorbic acid | 9.8 | 89.7 | 26.3 |
| 13 | .4% NaSCN | Blank | 11.0* | 0 | |
| 13 | .4% NaSCN | .05% Isoascorbic | 10.5 | | 4.5 |
| 13 | .4% NaSCN | .1% Isoascorbic | 9.4 | | 14.5 |
| 13 | .4% NaSCN | .2% Isoascorbic | 7.5 | | 31.8 |
| 13 | .4% NaSCN | .3% Isoascorbic | 6.8 | | 38.2 |

(I) % protection over uninhibited
(II) % protection over inhibitor only
*estimated from Table I

EXAMPLE XI

Corrosion rates determined from the static laboratory conditions isolated by inert nitrogen atmosphere may not demonstrate the real effectiveness of the antioxidant. Seven day corrosion rates in 18.5 ppg ZnBr$_2$/CaBr$_2$ were determined in oxygen pressurized cells. The addition of inhibitors, 0.9 wt. % ammonium thioglycolate and 0.4 wt. % sodium thiocyanate, reduces corrosion approximately 54 and 38%, respectively, over the uninhibited fluids. The addition of 0.4 wt. % aldose group antioxidant(s) to the inhibited fluid further reduced corrosion 51% over ammonium thioglycolate alone and approximately 79% over ammonium thiocyanate alone. The results were reported in Table VI, clearly illustrate two things: (1) inhibitors or antioxidants alone do not provide maximum corrosion control, and (2) the addition of aldose group antioxidants to zinc bromide/calcium bromide fluids inhibited with thio group inhibitor(s) further reduced corrosion up to 80% over the inhibitor alone.

TABLE VI

Seven Day Corrosion Tests in 18.5 ppg ZnBr$_2$/CaBr$_2$
at 350° F. in Oxygen Pressurized Cells

| Inhibitor | Scavenger | % Protection (I) | (II) |
|---|---|---|---|
| Blank | Blank | 0 | |
| HSCH$_2$COONH$_4$ | Blank | 54.1 | 0 |
| HSCH$_2$COONH$_4$ | Isoascorbic acid | 77.6 | 51.1 |
| NaSCN | Blank | 37.7 | 0 |
| NaSCN | Isoascorbic acid | 86.9 | 78.9 |

(I) % protection over uninhibited
(II) % protection over inhibitor only

I claim:

1. A corrosion inhibiting composition adapted for use with clear, high density fluids having application as well completion and workover media comprising:
   about 5-95 parts by weight of a thio group corrosion inhibitor selected from the group consisting of alkali metal and ammonium thioglycolates and thiocyanates, thiourea, mercapto acetic acid and salts thereof, dithiodiglycolic acid, and mixtures thereof; and
   about 95-5 parts by weight of an aldose group antioxidant selected from the group consisting of ascorbic acid and salts thereof, gluconic acid, and mixtures of ascorbic acid with gluconic acid.

2. A composition, as claimed in claim 1, wherein, when the corrosion inhibitor and antioxidant are provided in aqueous solution form.

3. A composition, as claimed in claim 1, wherein the thio group corrosion inhibitor is sodium thiocyanate.

4. A composition, as claimed in claim 1, wherein the thio group corrosion inhibitor is a mixture of sodium thiocyanate and ammonium thioglycolate.

5. A composition, as claimed in claim 1, wherein the aldose group antioxidant is ascorbic acid.

6. A composition, as claimed in claim 1, wherein the aldose group antioxidant is a mixture of ascorbic acid and gluconic acid.

7. A composition as claimed in claim 1, wherein the thio group corrosion inhibitor is sodium thiocyanate and the aldose group antioxidant is ascorbic acid.

8. A corrosion inhibitor, as claimed in claim 1, where in the thio group corrosion inhibitor is a mixture of sodium thiocyanate and ammonium thioglycate and the aldose group antioxidant is a mixture of ascorbic acid and gluconic acid.

9. A corrosion inhibited clear high density fluid for use as a well completion and workover medium comprising:
   a clear aqueous solution of zinc bromide and a calcium halide and, optionally, one or more an alkali metal halides and having a density of about 10 to 20 pounds per gallon;
   about 0.05-5.00 parts per hundred parts by weight of the clear solution of a thio group corrosion inhibitor selected from the group consisting of alkali metal and ammonium thioglycolates and thiocyanates, thiourea, mercapto acetic acid and salts thereof, dithiodiglycolic acid, and mixtures thereof; and
   about 95-5 parts by weight of an aldose group antioxidant selected from the group consisting of ascorbic acid and salts thereof, gluconic acid, and mixtures of ascorbic acid with gluconic acid.

10. A fluid, as claimed in claim 9, wherein the clear aqueous solution is a zinc bromide/calcium bromide solution having a density of about 14.2-19.2 pounds per gallon.

11. A fluid, as claimed in claim 9, wherein the thio group corrosion inhibitor is sodium thiocyanate.

12. A fluid, as claimed in claim 9, wherein the thio group corrosion inhibitor is a mixture of sodium thiocyanate and ammonium thioglycolate.

13. A fluid, as claimed in claim 9, wherein the aldose group antioxidant is ascorbic acid.

14. A fluid, as claimed in claim 9, wherein the aldose group antioxidant is a mixture of ascorbic acid and gluconic acid.

15. A fluid as claimed in claim 9, wherein the thio group corrosion inhibitor is sodium thioglycolate and the aldose group antioxidant is ascorbic acid.

16. A fluid, as claimed in claim 9, where in the thio group corrosion inhibitor is a mixture of sodium thiocyanate and ammonium thioglycolate and the aldose group antioxidant is a mixture of ascorbic acid and gluconic acid.

17. A method of completion or workover of wells comprising the injection into the well of the corrosion inhibited clear, high density fluid of claim 9.

* * * * *

UNITED STATES PATENT AND TRADEMARK OFFICE
CERTIFICATE OF CORRECTION

PATENT NO. : 4,784,778
DATED : November 15, 1988
INVENTOR(S) : Charles C. Shin

It is certified that error appears in the above-identified patent and that said Letters Patent is hereby corrected as shown below:

Column 2, line 48, after "are", insert --said--

Column 3, line 57, "then" should be --they--

Column 7, line 43, "inhibiting" should be --inhibition--

Column 8, line 59, "2.0" should be --0.2--

Column 8, line 65, "grup" should be --group--

Signed and Sealed this

Ninth Day of May, 1989

Attest:

DONALD J. QUIGG

Attesting Officer

Commissioner of Patents and Trademarks